United States Patent [19]

Ayabe

[11] Patent Number: 5,822,139
[45] Date of Patent: Oct. 13, 1998

[54] METHOD OF DETECTING THERMAL ASPERITY ERROR OF MR HEAD AND MAGNETIC DISK CERTIFIER USING THE SAME METHOD

[75] Inventor: Sakae Ayabe, Isehara, Japan

[73] Assignee: Hitachi Electronics Engineering Co., Ltd., Tokyo, Japan

[21] Appl. No.: 771,156

[22] Filed: Dec. 20, 1996

[30] Foreign Application Priority Data

May 10, 1996 [JP] Japan .................................... 8-140735

[51] Int. Cl.⁶ .............................. G11B 5/40; G11B 5/455
[52] U.S. Cl. ............................................ 360/31; 360/25
[58] Field of Search ............................ 360/77.08, 46, 360/55, 67, 75, 32, 31, 25; 324/210, 212, 213

[56] References Cited

U.S. PATENT DOCUMENTS

| | | | |
|---|---|---|---|
| 4,929,894 | 5/1990 | Monett ................................. | 360/31 X |
| 4,949,036 | 8/1990 | Bezingue et al. ..................... | 360/31 X |
| 5,121,057 | 6/1992 | Huber et al. ......................... | 360/25 X |
| 5,247,254 | 9/1993 | Huber et al. ......................... | 360/25 X |

*Primary Examiner*—Aristotelis M. Psitos
*Attorney, Agent, or Firm*—Fay, Sharpe, Beall, Fagan, Minnich & McKee

[57] ABSTRACT

The present invention resides, in a magnetic disk certifier for detecting one of a spike error and a positive modulation error on the basis of a read signal obtained by reading out by an MR head a test data written on a track of a magnetic disk as a first error of said magnetic disk and detecting one of a missing error and a negative modulation error as a second error, a method and apparatus for detecting a thermal asperity error of said MR head, by of detecting the first error and the second error in positions on said track, the positions having a recording length of a plurality of bits of the test data and judging a thermal asperity error when the first error and the second error are detected in one and the same position of the track.

12 Claims, 7 Drawing Sheets

METHOD OF DETECTING THERMAL ASPERITY ERROR OF MR HEAD AND MAGNETIC DISK CERTIFIER USING THE SAME METHOD

DESCRIPTION

1. Technical Field

The present invention relates to a method of detecting thermal asperity of a magneto-resistance effect head (referred to as "MR head", hereinafter) and a magnetic disk certifier using the same method and, particularly, to a method and apparatus for detecting, in a magnetic disk certifier, an error produced by thermal asperity of an MR head.

2. Background Art

Since, an error occurs in write data or read data of a magnetic hard disk used in a computer system when a magnetic medium, for example, a magnetic disk, thereof is abnormal, a quality of the magnetic disk is certified by writing a test data, for example, data of FFh on a predetermined track or tracks of the magnetic disk and reading it by a certifier. Incidentally, a letter h of the FFh indicates hexadecimal notation and the FFh means hexadecimal data bits all of which are "1".

FIG. 6 shows waveforms useful to understand bit error to be detected by a certifier.

Describing various bit errors occurring in a read data due to an abnormality of a magnetic disk with reference to FIG. 6, a waveform (a) shows a loss of bit which is generally called missing error (referred to as "MIS error", hereinafter). The MIS error occurs when a wave height of a bit or bits of a read signal obtained by reading a write signal is lowered below a predetermined value or lost. Assuming that a normal level of the read signal is at a predetermined reference voltage value $\pm Vm$ (Vm is set to 100% level, so that $\pm Vm = \pm 1$) and predetermined threshold values $\pm V_{S1}$ are set in a certifier in a ratio $V_{S1}/Vm = 0.01 \sim 0.99$, the MIS error is detected when a detected level of the read signal is lower than $+V_{S1}$ and larger than $-V_{S1}$. The reference voltage value $\pm Vm$ is given by an average read voltage value of a test data in one track immediately preceding a current test track, an average read voltage value of the test data in a plurality of tracks preceding the current track by 1~n tracks or an average read voltage value of the current test track.

A waveform (b) in FIG. 6 shows a spike error (referred to as "SPK error", hereinafter) which occurs by spiking of a bit. The SPK error is produced when a wave height of a read signal of some bit is out of a range defined by $\pm Vm$ (=$\pm 1$). The level of the read signal is compared with predetermined threshold values $\pm V_{S2}$ and the SPK error is detected when read signal level is larger than $+V_{S2}$ or smaller than $-V_{S2}$. Usually, $V_{S2}/Vm = 1.01 \sim 1.50$.

A waveform (c) in FIG. 6 is a positive modulation error (referred to as "P-MOD error", hereinafter) and corresponds to a state in which a read signal corresponding to a plurality of bits is modulated on a plus side, so that a positive and negative levels of an envelope of read signals of the respective bits are out of the range defined by $\pm Vm$. The P-MOD error is detected when the read signal envelope level is larger than $+V_{S3}$ and smaller than $-V_{S3}$. Usually, $V_{S3}/Vm = 1.01 \sim 1.50$.

A waveform (d) in FIG. 6 is a negative modulation error (referred to as "N-MOD error", hereinafter) and corresponds to a state in which a read signal corresponding to a plurality of bits is modulated on a minus side, so that a positive and negative levels of an envelope of read signals of the respective bits are out of the range defined by $\pm Vm$. The N-MOD error is detected when the read signal envelope level is smaller than $+V_{S4}$ and larger than $-V_{S4}$. Usually, $V_{S4}/Vm = 0.01 \sim 0.99$.

A waveform (e) in FIG. 6 is an extra error (referred to as "EXT error", hereinafter) and corresponds to a state in which, when data is read from a predetermined track after a test data written therein is erased, bits which were erased appear. This error is detected when a level of the read signal is out of a range defined by threshold values $\pm V_{S5}$. Usually, $V_{S5}/Vm = 0.01 \sim 0.99$.

The waveforms of the respective errors are usually featured by symmetry of envelope.

In a recent disk drive, data write is performed by using a magnetic head of coil type as in the conventional manner and data read is performed by using an MR head. Correspondingly thereto, a certifier also performs a data write by using the magnetic head of coil type and a data read by using the MR head.

FIG. 7 shows a construction of a conventional certifier. The certifier will be described briefly with reference to FIG. 7.

A magnetic disc 1 is mounted on a spindle 2a of a rotary mechanism 2 and a reference rotary position (index, referred to as "INDX", hereinafter) of the disc 1 and a rotation angle θ (=amount of disc rotation) are detected by pulses from a rotary encoder 2b. A track number ($T_rNo.$) and a test data, for example, the previously mentioned FFh data are supplied from an MPU 541 provided in a control unit 54 of a test device 5 to a write control unit 51.

The write control unit 51 is adapted to drive a head carriage (not shown) to move the magnetic head to a track of the disc 1 according to the track number, to convert the given test data into a predetermined current signal and send it to a write circuit portion of a write/read circuit 50 with a predetermined timing and to drive the magnetic head 3 therethrough. The test data is written in the track $T_R$ sequentially with using the INDX signal indicative of the reference rotary position as a start point.

The control unit 54 includes the MPU 541, a memory 542 storing control programs, etc., and a CRT display (CRT) 543, etc.

After the test data is written, the test data is read out from the track through the MR head 4 and a read circuit portion of the write/read circuit 50. An analog read signal output from the write/read circuit 50 is supplied to an amplifier 521 of an error detection unit 52 in which its level is suitably regulated and input to comparators 522 and 523. In FIG. 7, the magnetic head 3 and the MR head 4 are assembled as a single head unit and oppose to one and same track. Since frequency of the read signal is twice the bit frequency of the write data, the data FFh is sometimes called as $2f$ signal. Thus, a magnetic recording is performed with the track of the magnetic disc being magnetically reversed bit by bit.

The certifier detects the respective errors correspondingly to the respective bits of the test data. In order to realize this, the error detection unit 52 is provided with the comparator 522 for positive signals and the comparator 523 for negative signals. Threshold values $\pm V_S$ are set in the comparators 522 and 523 by a threshold setting circuit 56 according to the kind of error supplied from the MPU 541. That is, when the MIS error is to be detected, $\pm V_S = \pm V_{S1}$ are set in the comparators. Similarly, for the SPK error detection, $\pm V_S = \pm V_{S2}$ are set in the comparators, for the P-MOD error, $\pm V_S = \pm V_{S3}$ are set in the comparators and, for the N-MOS error detection, $\pm V_S = \pm V_{S4}$ are set in the comparators. For the EXT error detection, $\pm V_S = \pm V_{S5}$ are set in the comparators.

The read analog signal from the MR head is compared with the threshold values in the comparators 522 and 532, respectively, and outputs of the comparators 522 and 533 are positive error bits and negative error bits, respectively. The error bits thus detected by the comparator 522 is input to one input of an OR gate 525 and the error bits detected by the comparator 523 is inverted by an inverter 524 and supplied to the other input of the OR gate 525.

An error detection circuit 526 produces a sector position bit data (sector number) of the disc 1, a position byte data (referred to as "error position data", hereinafter) and a write address of an error memory 53 on the basis of an INDX signal (rotational reference position signal) of the disc 1 and a rotary position data which are supplied from the rotary encoder 2b. The error position data and a pattern data (referred to as "error bit data", hereinafter) composed of an error byte which is detected by the comparators 522 and 523 are written in the address assigned by the address signal with a predetermined timing. The error bit data is composed of 8 bits corresponding to the respective bits of the test data and each bit being "1" when there is an error or "0" when there is no error. Therefore, the respective bits of the error bit data indicate an existence or absence of error of each of the test data.

Such error data are sequentially written in the error memory (ERR.MEM) 53 while the address is updated by the error detection circuit 526. The error position data mentioned above indicates a position on a test tack and usually includes the written test data of 1 byte.

The error detection unit 52 is shown so as to detect the error of one kind. Practically, however, the error detection unit 52 includes a plurality of detection circuits assigned to the respective MIS error, N-MOD error and P-MOD error so that these errors can be detected simultaneously. That is, the error detection circuit 526 produces, in addition to the error position data and the error bit data, an error data containing an identifying code indicative of the kind of error, which is written in respective addresses of the ERR.MEM 53 sequentially.

The detection of the EXT error and the SPK error is done not simultaneously with the detection of the MIS, N-MOD and N-MOD errors but separately therefrom. That is, the detection of the EXT and SPK errors is performed for the same track as that for which the detection of the MIS, N-MOD and P-MOD errors was performed. Particularly, the detection of the EXT error is performed through the steps of erasing the test data written in the track, setting the threshold values $\pm V_{S5}$ in the comparators 522 and 523 and reading the signal from the same track by means of the MR head.

When such error detection is performed, the error data for one track, which is, for example, 4 bytes including the 5 errors and the identifying codes such as shown in FIG. 8, is stored in the ERR.MEM 53. The 4-byte error data shown in FIG. 8 includes the sector number (sector position data) of 10 bits, the byte position of the sector, in which the error bit data is positioned, of 10 bits, the error bit data of 8 bits (1 byte) and the identifying code and other flags of 4 bits.

As a result, the ERR.MEM 53 stores the error bit data of 1 byte including error bit "1" corresponding to a position on 1 track, in which an error occurs, together with the position in 1 byte section on the track sectioned in byte unit.

When a predetermined number of error bits (or a predetermined number of sectors) for one track is stored in the ERR.MEM 53, the error position data and the error bit data are read in the control unit 54, stored in the memory 542, transferred to a hard disk (not shown) together with the track number TNo under test and written therein sequentially. The control unit 54 updates the test track when a test data for 1 track is obtained. The 5 kinds of error for all tracks of the disk 1 are detected.

Such error data stored in the hard disk is read out by the MPU 541, edited thereby and printed out by a printer (PRT) 55 and/or displayed on the CRT display 543.

It has been known that the MR head 4 has a characteristics called thermal asperity. That is, the waveform of a read signal output of a MR head is generally varied with change of temperature. Assuming that the disk 1 has some protrusions and the MR head 4 collides therewith during an error detection using the certifier, temperature of the MR head 4 shall be raised instantaneously by such collision and the waveform of read signal from the MR head is deformed temporarily. This phenomenon is called thermal asperity (referred to as ASP, hereinafter).

The variation of read signal due to ASP is detrimental and causes a recorded data to be error. On the other hand, if there are such protrusions, the magnetic head 3 for data write and the MR head 4 collide with them causing the disk 1 to be broken. Therefore, the absolute condition of the disk 1 is that there is completely or substantially completely no protrusion higher than a predetermined height and it is usual to remove such protrusions from the disk 1 by polishing.

Even so, there are practically some disks which have some protrusions higher than the predetermined height and such disk causes the thermal asperity error (referred to as ASP error, hereinafter) to occur.

It is desirable to replace an MR head and to scrap the disk when such thermal asperity error is detected. So long as the inventors know, however, the detection of ASP error has been not practiced.

It is anticipated that, with possible increase of the memory density of magnetic disk in the future, the detection of the ASP error must become unavoidable in view of the reliability of magnetic disk.

SUMMARY OF THE INVENTION

An object of the present invention is to provide a method of detecting ASP error of a MR head.

Another object of the present invention is to provide a magnetic disk certifier capable of detecting ASP error to thereby allow a reliable disk test.

In a magnetic disk certifier for detecting one of a spike error and a positive modulation error on the basis of a read signal obtained by reading out by an MR head a test data written on a track of a magnetic disk as a first error of the magnetic disk and detecting one of a missing error and a negative modulation error as a second error, the present invention is featured by a method of detecting a thermal asperity error of the MR head, which comprises the steps of detecting the first error and the second error in positions on the track, each of the positions having a recording length of a plurality of bits of the test data and judging a thermal asperity error when the first error and the second error are detected in one and the same position on the track.

A magnetic disk certifier according to the present invention, to which the above mentioned method is applied, is featured by comprising a detector for producing a rotation reference signal indicative of a rotational reference of the magnetic disk, a write circuit for writing the test data, a read circuit for outputting the read signal as an analog signal, memories, an error detection unit for producing bits indicative of presence or absence of errors corresponding to respective bits of the test data by comparing the analog signal with predetermined threshold values, and storing the bits in the memories as error data and a control circuit for detecting a thermal asperity error when the first and second errors exist on one and the same position on the track, the position determined by a recording length of the test data corresponding to a plurality of bits and the rotational reference signal, on the basis of a first error data obtained from said memories by setting a first one of the predetermined threshold values in the error detection unit, the first threshold value being used to detect one of the first error and the second error, and a second error data obtained from the memories by setting a second one of the predetermined threshold values in the error detection unit, the second threshold value being used to detect the other of the first error and the second error.

FIG. 9 shows an example of a read signal obtained through an MR head and deformed due to the ASP. Due to the ASP, the waveform of the read signal from the MR head is shifted toward the positive side as if a reference potential 0 (zero potential) of the read signal is raised to a potential 0' although the amplitude of the read signal envelope (wave height value) is not changed substantially. When the polarities are reversed, the reference potential (zero potential) is lower, so that the envelope is shifted toward negative side.

The deformation of the read signal from the MR head due to the shift of the reference potential, which is caused by collisions of the MR head with protrusions on the disk has been confirmed through experiments by the present inventors.

Considering the waveform of the read signal deformed by the ASP, it becomes higher than a predetermined threshold value on the positive side and higher than a predetermined threshold value on the negative side when the reference potential 0 is shifted toward the positive side (upper side), or it becomes lower than the predetermined threshold value on the positive side and lower than the predetermined threshold value on the negative side when the reference potential 0 is shifted toward the negative side (lower side).

Therefore, it can be considered that the read signal waveform with deformation due to the ASP being larger than a predetermined level is detected together with the various other errors. In the waveform shown in FIG. 9, since the influence of the ASP is instantaneous and the waveform is changed within a short time, the SPK and MIS errors may be first produced in substantially the same position of the disk. Further, since the number of bits of an error of the read signal whose envelope is within a range defined by the positive and negative side threshold values is larger than that of an error of the read signal whose envelope is outside of the range defined by the positive and negative side threshold values, it can be detected as the MOD error. Particularly, in a case where the influence of the ASP is not instantaneous, it can be detected as the MOD error. Therefore, it is further possible to detect the ASP error when the SPK and N-MOD errors, the MIS and P-MOD errors or the P-MOD and N-MOD errors are detected in the same position of the disk.

So far, the accuracy of positional detection by means of the rotary encoder 2b is not so high as allowing the error to be detected in exact peak positions of the respective waveforms shown in FIG. 9. Therefore, a detecting position of an error detected at a peak in the vicinity of the positive or negative threshold value may be shifted by 1 bit or more from the peak position. The one and same position mentioned previously must be determined by taking such shift into consideration. Therefore, a range of the one and same position is expanded to a recording length within which several error bits are detected to thereby expand a range of test data to a plurality of bits as a unit.

Considering the ASP detection under such data range, there is no need of providing a specific ASP detection means, and the ASP error can be detected by detecting an error satisfying the previously mentioned ASP error condition from error bits contained in the various kinds of error bits which have been detected by the certifier and stored already.

That is, the ASP error can be detected when the SPK and MIS errors, the SPK and N-MOD errors, the MIS and N-MOD errors or the P-MOD and N-MOD errors, are detected in the same position on the disk.

BRIEF DESCRIPTION OF THE DRAWINGS

FIG. 6 shows waveforms of various errors, in which FIG. 6(a) shows a MIS error (missing error) waveform, FIG. 6(b) shows a SPK error (spike error) waveform, FIG. 6(c) shows a P-MOD error (positive modulation error) waveform, FIG. 6(d) shows an N-MOD error (negative modulation error) waveform and FIG. 6(e) shows an EXT error (extra error) waveform;

DETAILED DESCRIPTION OF THE PREFERRED EMBODIMENTS

Figure 4:
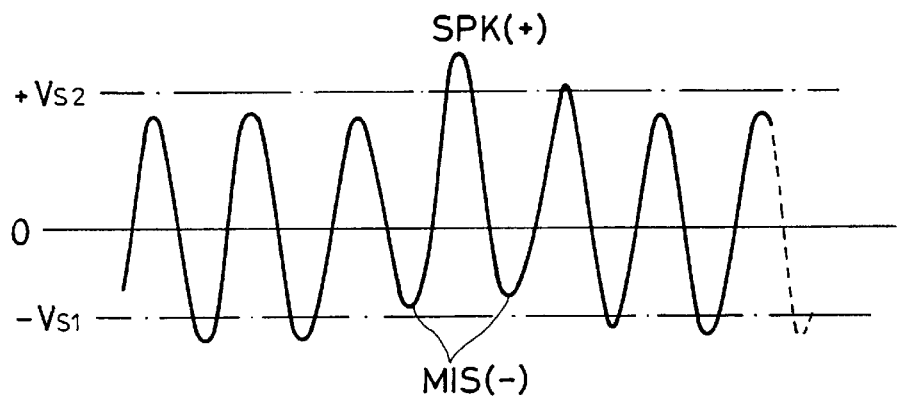
FIG. 4 illustrates a principle of the ASP error detection of MR head, according to the present invention.
Figure 9:
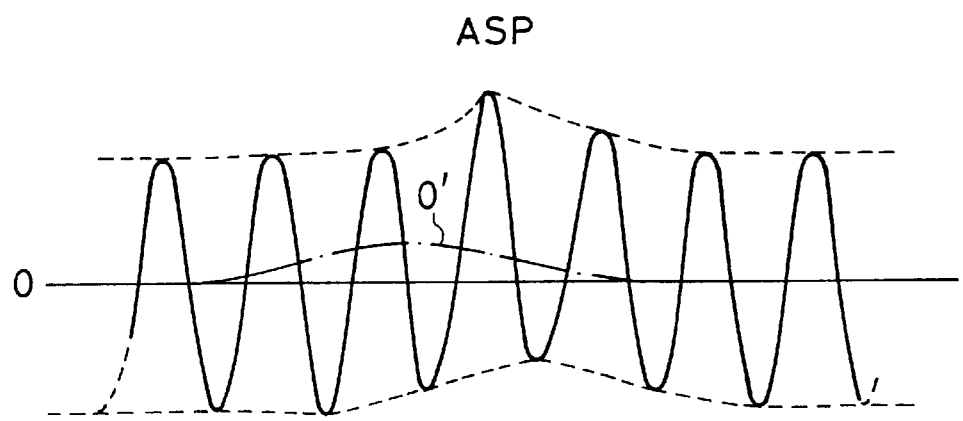
FIG. 9 is a waveform showing a thermal asperity (ASP).

FIG. 4 shows a relation between the ASP error waveform shown in FIG. 9 and the SPK and MIS errors. As shown in FIG. 4, the waveform is deformed by the ASP error such that a portion thereof on a positive side is more positive and on a negative side is less negative. The more positive portion is detected as an error bits of the positive SPK error (SPK(+)) by the threshold value $+V_{S2}$ in detecting the SPK error and the less negative portion is detected as error bits of the MIS error (MIS(−)) by the threshold value $-V_{S1}$ in detecting the MIS error.

On the other hand, as described previously with reference to FIG. 6, the magnitude of the SPK or MIS error signal becomes larger or smaller substantially symmetrically and it is considered that such error signal waveform is never deformed like that caused by the ASP error. In other words, an error having waveform such as shown in FIG. 9 is neither SPK error nor MIS error. Therefore, it is possible to judge that the error signal having the waveform such as shown in FIG. 9 is caused by ASP error.

Incidentally, in FIG. 9, the ASP error waveform is shifted to the positive side. When an ASP error signal is shifted to the negative side, the SPK error (SPK(−)) appears on the negative side and the MIS error(MIS(+)) appears on the positive side.

Figure 6:
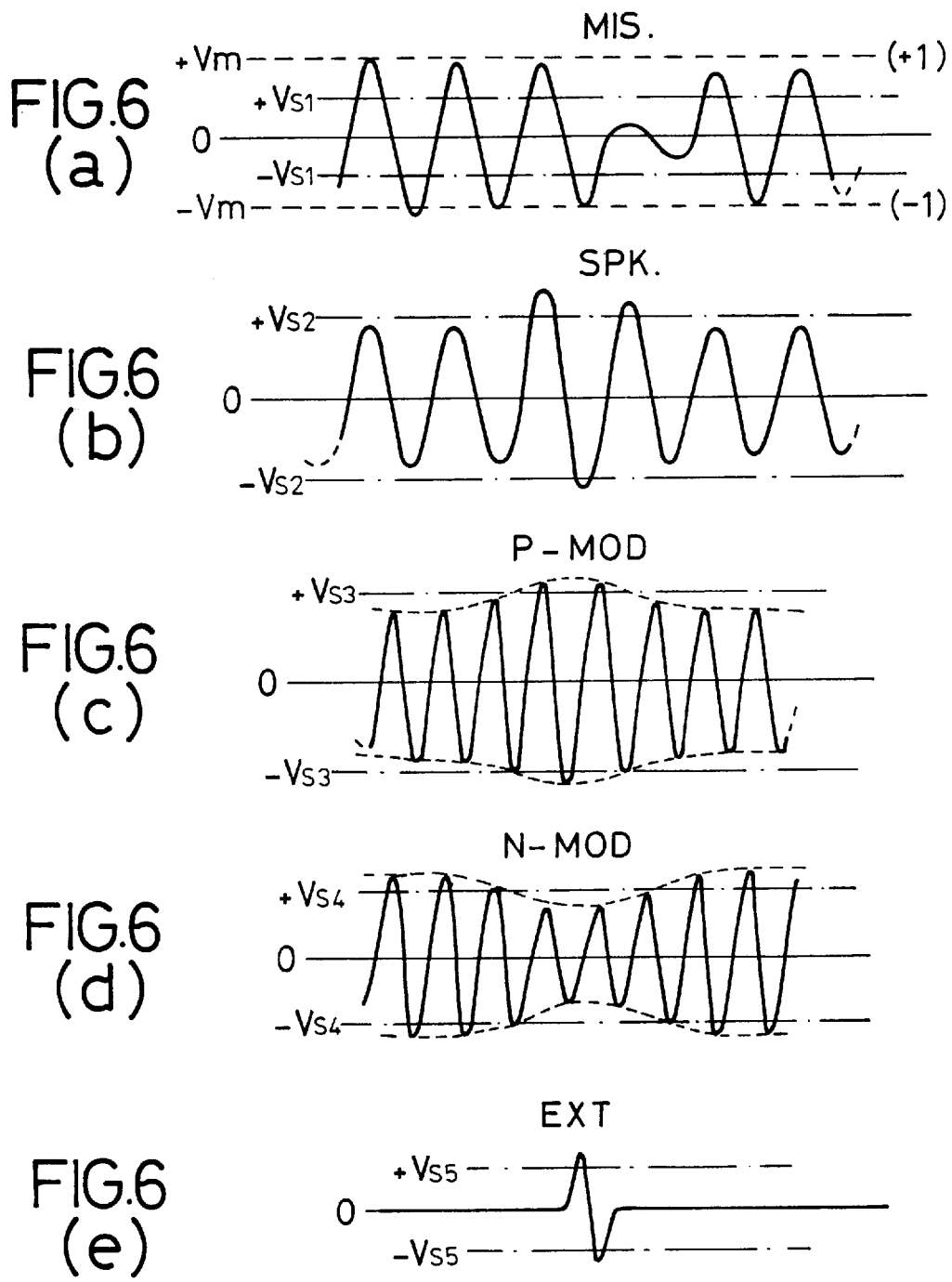

Since the number of bits of an error signal having a peak inside the threshold value is larger than that outside the threshold value, it can be detected as the MOD error. Further, as mentioned previously, when the effect of the ASP error is slow, the waveform is detected as the MOD error. Therefore, as is shown in FIG. 6, it is possible to detect the ASP error by combining the SPK and the N-MOD errors or the MIS and P-MOD errors and the P-MOD and N-MOD errors.

As mentioned previously, the position on the disk 1 in which an error occurs can not be determined precisely even when the judgement is performed in a bit recording length as a unit since a bit shift occurs due to a variation of rotation speed of the disk. Therefore, in the present invention, the recording length is employed as a byte unit, the detection of the various errors shown in FIG. 6 is performed within this range and the APS error is detected. Further, by setting such range as the error detection area, the bit by bit judgement becomes impossible. Further, as is clear from the relation between the error detection and the detection waveforms shown in FIG. 4 or FIG. 6, there is no need of detecting the SPK and MIS errors with the polarity (+) and (−) inclusive.

As a result, in this invention, the ASP error is detected when any of the following cases (1) to (4) occurs in the same position of the disk with a plurality of bits of the test data being a position unit:
(1) the SPK and MIS errors occur,
(2) the SPK and N-MOD errors occur,
(3) the P-MOD and MIS errors occur,
(4) the P-MOD and N-MOD errors occur. In each of the above four cases, the sequence of the two errors can be reversed.

Figure 1:
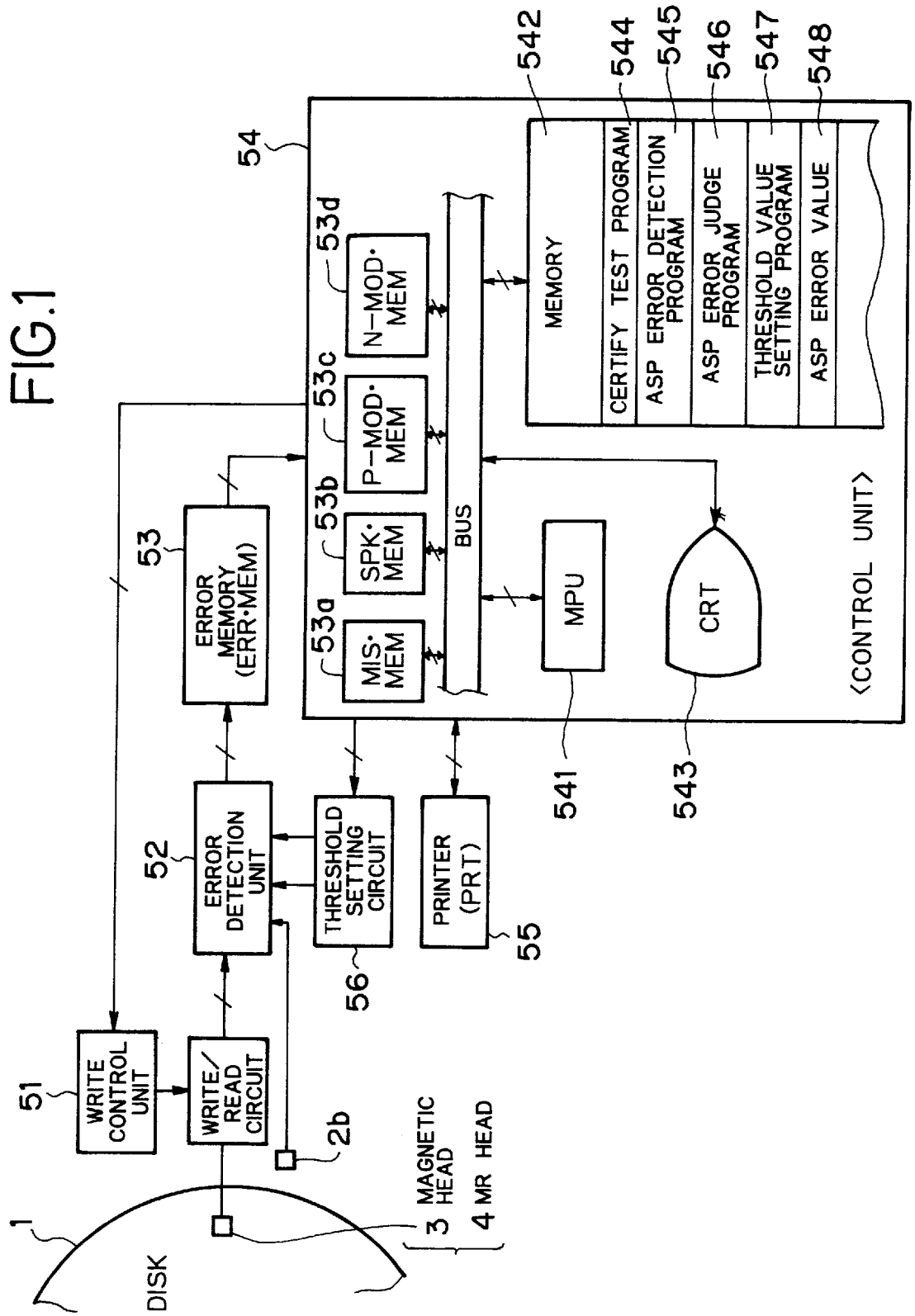
FIG. 1 shows a construction of an embodiment of a certifier utilizing a method of detecting ASP error of a MR head, according to the present invention.
Figure 7:
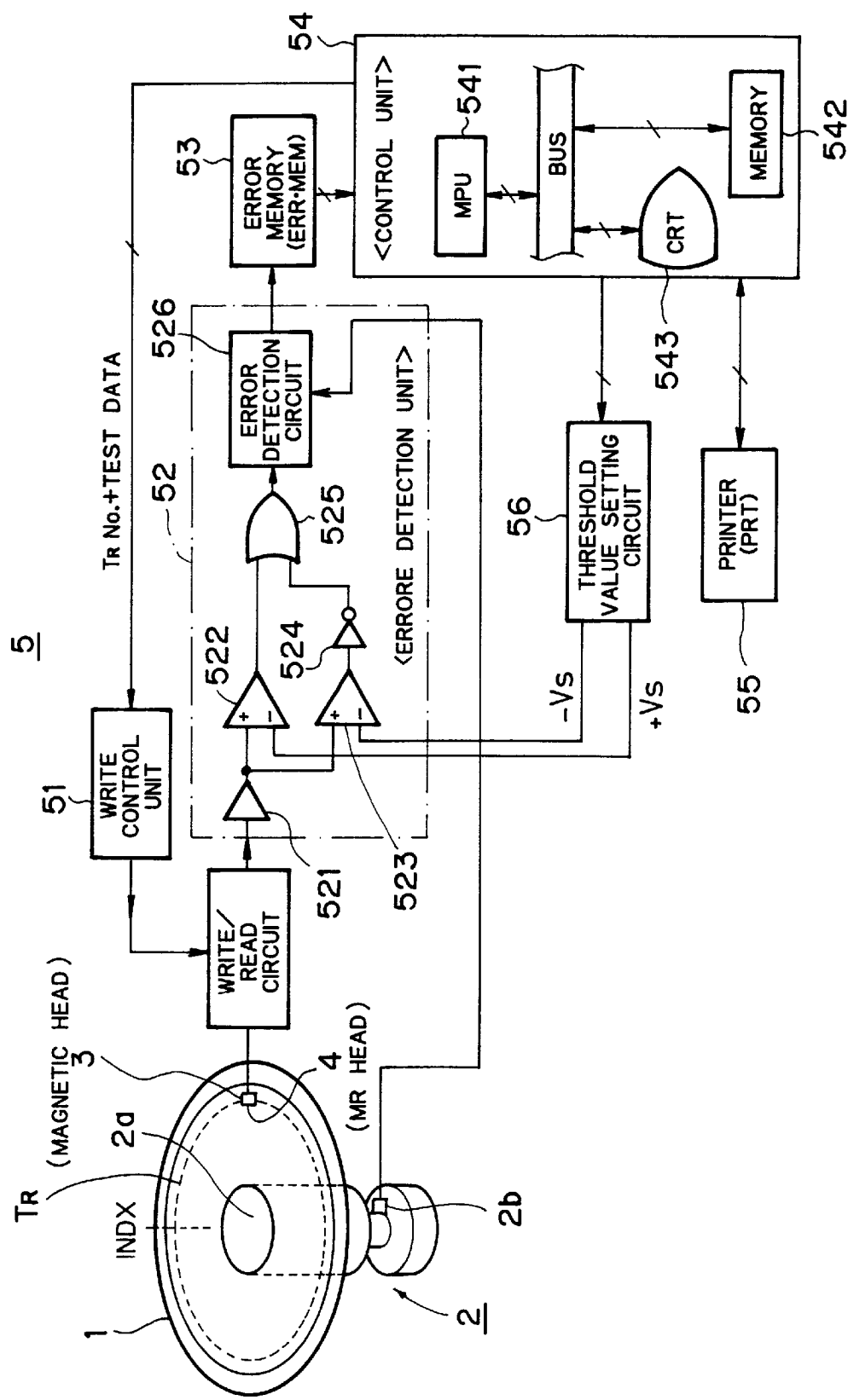
FIG. 7 is a general block circuit diagram of the certifier.
Figure 8:
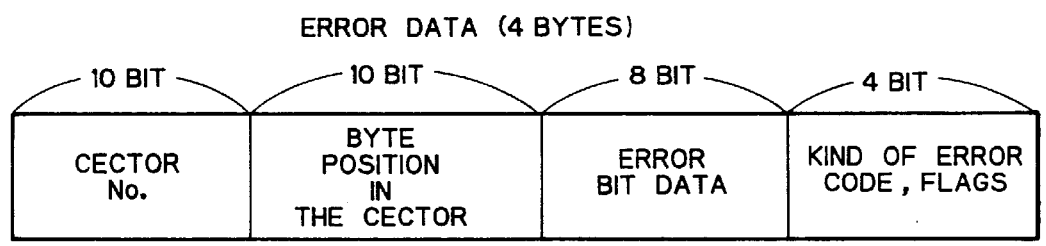
FIG. 8 shows an example of an error data.

FIG. 1 is a block diagram of the certifier for detecting the ASP error, in which the same constructive components as those shown in FIG. 7 are denoted by the same reference numerals, respectively, and detailed description thereof is omitted.

The difference of the circuit shown in FIG. 1 from that shown in FIG. 7 is that a control unit 54 shown in FIG. 1 includes error memories 53a, 53b, 53c and 53d corresponding to the MIS, SPK, P-MOD and N-MOD errors, respectively, and a memory 542 of the control unit 54 is provided with a certifying test program 544, an ASP error detection program 545, an ASP error judgement program 546, a threshold setting program 547 and an ASP error value 548.

The ASP error test is performed in the same way as in the conventional by storing, in an ERR.MEM 53, the five kinds of error corresponding to one track correspondingly to the respective bits of the test data, causing the MPU 541 to execute the certify test program 544 by calling the ASP error detection program 545 and causing the MPU 541 to execute the ASP error judgement program 546.

The MPU 541 transfers the error data shown in FIG. 9 from the ERR.MEM 53 to the error memories 53a to 53d by executing the ASP error detection program 545, detects the ASP error by referencing the error memories 53a to 53d and counts the number of occurrences of these errors.

That is, the MPU 541 references the error identifying code in the ERR.MEM 53 and, when the error is a MIS error, it reads out the error position data (the sector position data (sector number) of the disk 1 and the byte position data in that sector) of the MIS error and the error bit data (in this example, 1 byte) which are stored in the error memory (MIS.MEM) 53a. When the error is an SPK error, the above mentioned error position data and the error bit data are stored in the error memory (SPK.MEM) 53b. Further, when the error is a P-MOD error, the above mentioned error position data and the error bit data are stored in the error memory (P-MOD.MEM) 53c and, when the error is a N-MOD error, the above mentioned error position data and the error bit data are stored in the error memory (N-MOD.MEM) 53d.

The error data is transferred by performing this procedure while updating the address of the ERR.MEM 53 and updating addresses of the error memories 53a, 53b, 53c and 53d correspondingly to the address update of the ERR.MEM 53 such that the same error position data are stored in the same memory addresses of the respective memories, and the error data corresponding to one track is stored in the memories correspondingly to the kind of error. Thus, the error data without the identifying codes are stored in the error memories 53a, 53b, 53c and 53d corresponding to the respective kinds of error in the same sequence as that of the position data and the position data of the same positions are stored in the same addresses.

After this processing, it is judges by referencing the respective memories 53a to 53d whether or not any of the previously mentioned conditions (1) to (4) is established. When any of the four conditions is established, an ASP error is detected. The ASP error value 548 is incremented every time when the ASP error is detected.

The ASP error detection processing to be performed after the error data is transferred to the respective memories 53a to 53d will be described with reference to FIG. 2. First, the ASP value 548 is cleared, search addresses An, etc., are initialized (step 101), the error data is read out from a predetermined address An (at first, the initial value) of the SPK.MEM 53b (step 102) and then it is judged whether or not there is an error bit in the error bit data of 1 byte (step 103). If there is and an SPK error is detected, the same address An of the MIS.MEM 53a is accessed to read out the error data therefrom (step 104) and it is judged whether or not there is an error bit in the error bit data of 1 byte (step 105). If there is a MIS error bit, then it is judged whether or not the error position data read out from the SPK.MEM 53b and the MIS.MEM 53a are coincident (step 106). If they are coincident, then the ASP error value 548 is incremented (step 107). Then, it is judged, by judging whether or not the current address value An is an end address, whether or not the detection processing is completed (step 108). If the detection processing is not completed as yet, the current address An is updated to An+1 (step 109) and the process is returned to the step 102 to repeat the above mentioned procedures.

When, in the step 103, there is no SPK error in the 1 byte error bit data read out, the process is moved to a step 103a. In the step 103a, the address An of the P-MOD.MEM 53c is not updated and the error data is read out from the same address to judge whether or not there is an error bit in the error bit data of 1 byte of the read out error data (step 104a). If there is a P-MOD error bit, the process is shifted to the step 104 in which the error data is read out from the same address An of the MIS.MEM 53a. Then, it is judge whether or not there is an error bit in the error bit data of 1 byte of the read out error data (step 105). If there is a MIS error bit, then it is judged whether or not the error position data read out from the P-MOD.MEM 53c and the MIS.MEM 53a are coincident (step 106). If they are coincident, then the ASP error value 548 is incremented in the step 107. Then, in the step 108, it is judged whether or not the detection processing is completed. If the detection processing is not completed as yet, the current address An is updated in the step 109 and the process is returned to the step 102 to repeat the above mentioned procedures.

When, in the step 105, there is no MIS error in the 1 byte error bit data read out, the process is moved to a step 105a. In the step 105a, the address An of the N-MOD.MEM 53d is not updated and the error data is read out from the same address to judge whether or not there is an error bit in the error bit data of 1 byte of the read out error data (step 106a). If there is an N-MOD error bit, the process is shifted to the step 106. In the step 106, when the judgement in the step 104a is YES, it is judged whether or not the error position data read out from the P-MOD.MEM 53c and the N-MOD.MEM 53d are coincident. If the judgements in the step 106 are YES, the ASP error value 548 is incremented in the step 107. Then, in the step 108, it is judged whether or not the detection processing is completed. If the detection processing is not completed as yet, the current address An is updated in the step 109 and the process is returned to the step 102 to repeat the above mentioned procedures.

When the judgements in the steps 104a, 106a and 106 are NO, the process is shifted to the step 108 to judge whether or not the detection processing is ended.

In this manner, the MPU 541 obtains the number of occurrences of ASP error as the ASP error value in the step 107 by executing the ASP error detection program 546.

When it is judged in the step 108 that the detection process is completed, then it enters into the ASP error judgement (step 110).

In the ASP error judgement, the MPU 541 judges the ASP error whether or not the ASP error is large enough to require a replacement of the MR head, by executing the ASP error judging program 547. That is, a result of the latter judgement produces a practical ASP error detection.

In the judgement according to the ASP error judging program 547, the number of occurrences of ASP error is compared with a predetermined reference value and, when the number of ASP errors exceeds the reference value, the ASP errors are judged as those requiring the replacement of the MR head and the result of the judgement is stored. Simultaneously therewith, an instruction of replacement of the MR head and repeating of test is displayed on the CRT display 543 and the result of the judgement of the ASP error is printed out by the printer 55 (step 111). After the MR head is replaced by a new one, the same test is repeated with using the same disk and, when the number of occurrences of ASP error exceeds the reference value again, the MPU 541 displays on the CRT display 543 an instruction of replacement of the MR head and abandonment of the disk.

The reference value for determining an ASP error requiring a replacement of the MR head is related to the threshold values set for detection of the respective errors. As mentioned previously, the threshold values for the MIS and P-MOD errors with respect to the reference value, $V_{S1}/V_m$ and $V_{S3}/V_m$, are within a range from 0.01 to 0.99 (1% to 99%), respectively, and the threshold values for the SPK and N-MOD errors, $V_{S2}/V_m$ and $V_{S4}/V_m$, are within a range from 1,01 to 1.50 (101% to 150%), respectively. If the respective threshold values be set to, for example, values in the vicinity of 1, the predetermined reference value for judging the ASP error may become 0 to 2. The predetermined reference value is preferably selected from experimental values obtained by checking head crush of the MR head with respect to a plurality of disks.

Practically, the range of the threshold values for the MIS and N-MOD errors is 33% to 99%, that for the SPK and P-MOD errors is 105% to 150% and that for the EXT error is 10% to 99%. Since, when values approximating 1 are selected for these threshold values within the respective ranges, the respective errors may easily occurred, the reference value will becomes larger than the above mentioned value. Further, in a case where the ASP error is recognized in the first judgement, it is possible to replace the MR head and to abandon the associated disk immediately.

When there is no ASP error in the ASP error judgement in the step 110, the track number is updated and a next track is tested in the same manner as mentioned previously.

Figure 3:
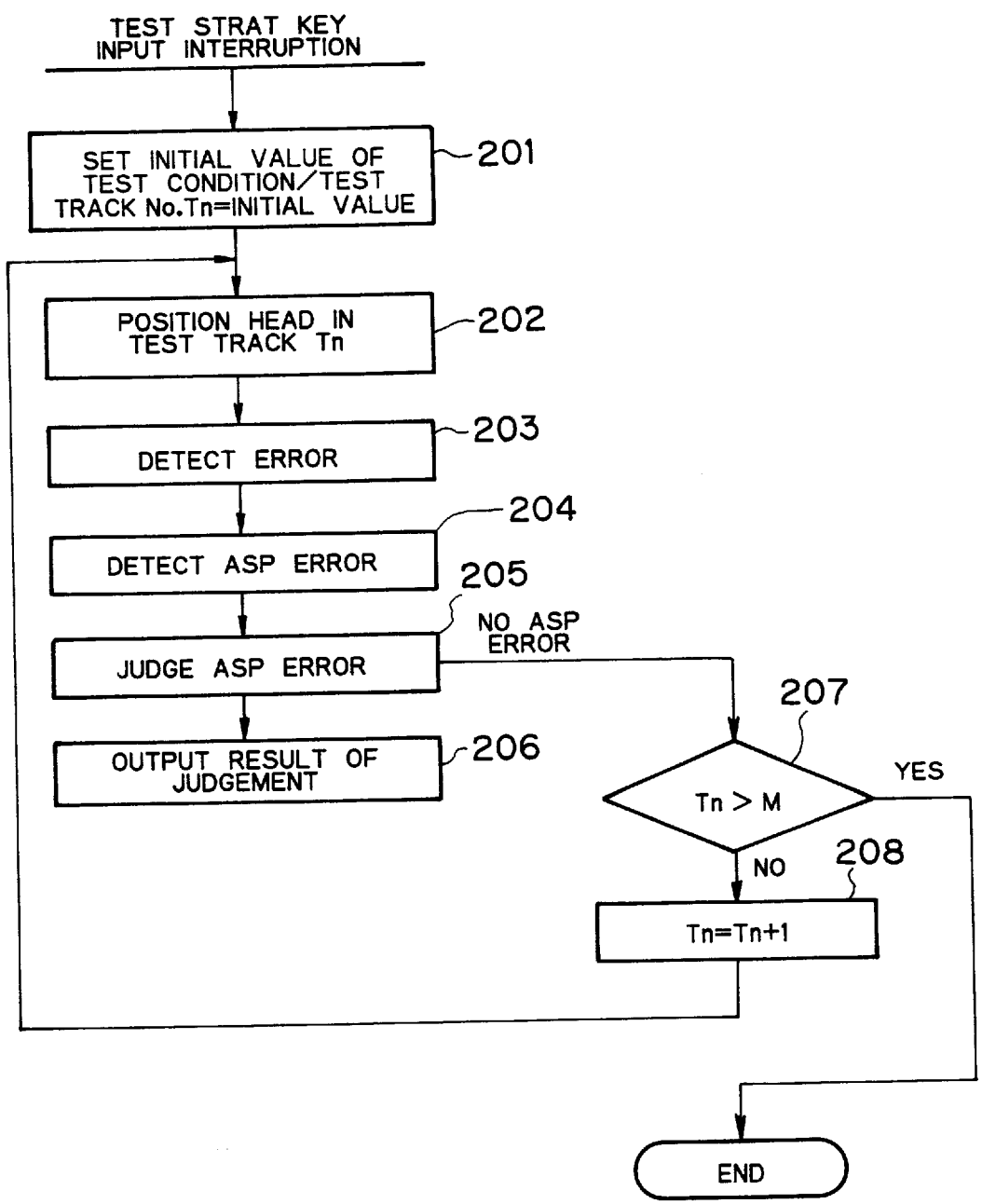
FIG. 3 is a flowchart of a certifier processing including ASP error.

The certifier test which is performed by execution of the certify test program 544 by the MPU 541 will be described with reference to FIG. 3.

First, upon an input of a start of a predetermined test through a function key, initial values necessary as test conditions are set and an initial value of a test track number Tn is set (step 201). It is assumed that a parameter of a sequence of error tests, for example, simultaneous tests of MIS, N-MOD and P-MOD errors first, then a test of the SPK error and finally a test of the EXT error for a predetermined track is set preliminarily as one of these test conditions.

The head is positioned on the Tn-th (initially, the initial value) test track (step 202) and the error detection process is started (step 203). At first, the threshold values for the MIS, N-MOD and P-MOD errors are set in an error test unit 52, a test data is written in the track, the test data is read out from the same track and the MIS, N-MOD and P-MOD error data each for 1 track are stored in the ERR.MEM 53. Then, the threshold value for the SPK error is set, a test data is written in the track, the test data is read out from the same track and the SPK error data for 1 track is stored in the ERR.MEM 53. Finally, the threshold value for the EXT error is set, a test data is written in the track, the test data is read out from the same track and the EXT error data for 1 track is stored in the ERR.MEM 53.

Figure 2:
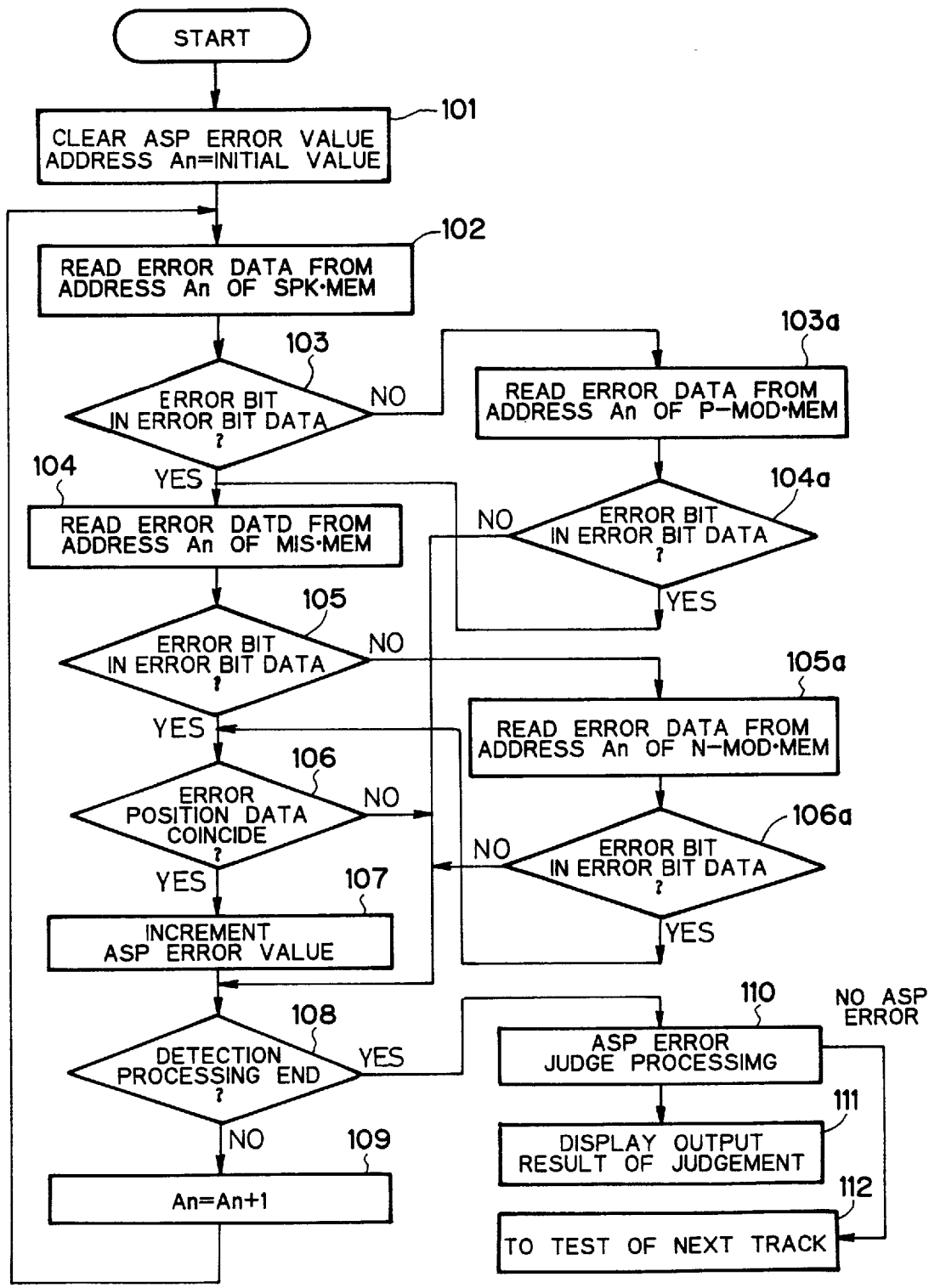
FIG. 2 is a flowchart of an ASP error detection and processing system of the present invention.

After these error tests complete, the process enters into the ASP error detection processing shown in FIG. 2 (step 204), in which the MPU 541 performs the processing according to the flowchart shown in FIG. 2 by executing the ASP error detection program 546 and the ASP error is stored as an ASP error value 548.

Then, the ASP error judgement is started (step 205), the MPU 541 compares the detected value with the predetermined reference value by executing the ASP error judgement program 547 and, when the detected value exceeds the reference value, a judgement of replacement of the MR head is provided. The result of judgement is displayed on the CRT display 543 or the test result of the ASP error is output to the printer 55 (step 206). When the judgement result indicates an existence of the ASP error, the MR head is replaced and the test is performed again from the step 201.

When there is no ASP error in the ASP error judgement in the step 206, it is judged whether or not the test processing is completed (step 207). This judgement is performed by judging whether or not the test track number Tn is larger than the maximum track number M. That is, when Tn >M, the test processing is completed. When the result of judgement in the step 207 indicates that the test processing is not completed, the track number Tn is updated to Tn+1 (step 208) and the process is returned to the step 202 to perform the same processing for the next track.

Although, in this embodiment, the error memories 53a to 53d are provided correspondingly to the kinds of error and store the error data without the kind of error codes transferred thereto, these error memories may be provided in the memory 542 of the control unit 54 as memory regions. In the latter case, the access addresses of the respective memory regions may become addresses corrected by amounts corresponding to positions of the memory regions in the memory 542.

Figure 5:
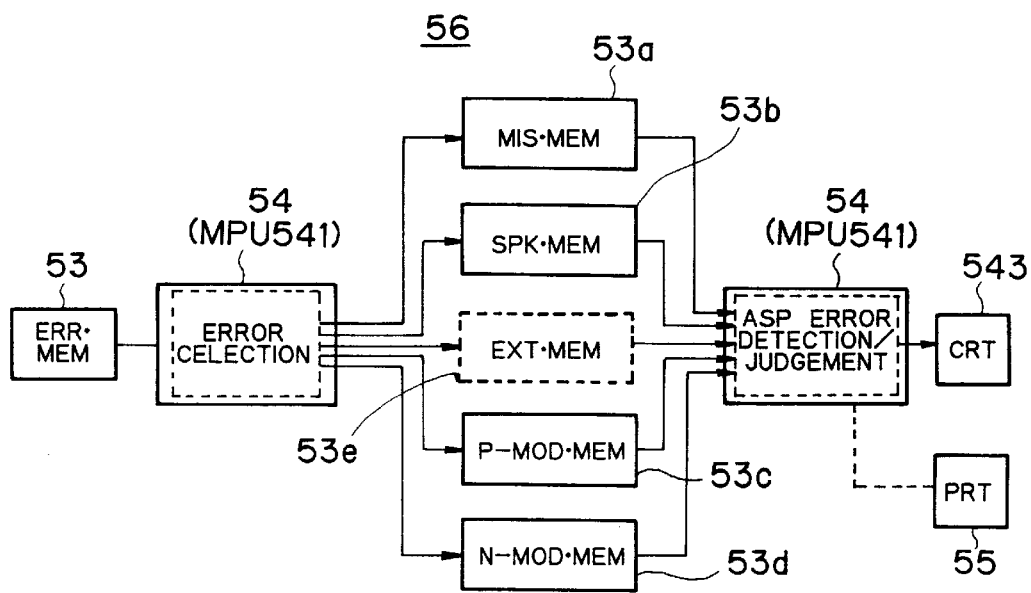
FIG. 5 is a functional block diagram showing an ASP error detection of the certifier.

FIG. 5 is a functional block diagram of the certifier for the ASP error test. In FIG. 5, the MIS, SPK, P-MOD and N-MOD errors of the error data stored in the ERR.MEM 53 are selected by the MPU 541 according to the kind of error codes and selectively transferred to the MIS.MEM 53a, SPK.MEM 53b, P-MOD.MEM 53c and N-MOD.MEM 53d, respectively. Then, the MPU 541 detects the ASP error on the basis of the errors stored in the memories 53a to 53d and the result of the detection and the necessity of replacing the MR head are supplied to the printer 55 or the CRT display 543.

As shown by a dotted line in FIG. 5, it is possible to remove the ERR.MEM 53 by providing the EXT.MEM 53e for storing the EXT error data. That is, in such case, the output of the error detection unit 52 is selectively supplied to one of the error memories 53a to 53e according to the kind of the error detected thereby.

Instead of providing the error memories 53a to 53e correspondingly to the kinds of error, the MPU 541 may access the error data stored in the ERR.MEM 53 directly. In the latter case, when there is an error bit in 1 byte of, for example, the SPK error, the ASP error is detected by judging in the same position in the next step whether or not the MIS error exists. Similarly, when there is an error bit in 1 byte of the SPK error, the ASP error is detected by judging in the same position in the next step whether or not the N-MOD error exists. Further, when there is an error bit in 1 byte of the MIS error, the ASP error is detected by judging in the same position in the next step whether or not the P-MOD error exists and, when there is an error bit in 1 byte of the N-MOD error, the ASP error is detected by judging in the same position in the next step whether or not the P-MOD error exists.

Further, it is possible to use the MIS.MEM 53a to N-MOD.MEM 53d as flag memories for giving error flags correspondingly to the error positions. That is, in a case where it is found, by detecting an error bit in an error bit data corresponding to the kind of error code by accessing the ERR.MEM 53, that there is an error bit, the error flag is stored in an address of a corresponding one of the memories 53a to 53d, which address corresponds to the error position data of the error bit. In such case, it becomes possible to detect the ASP error by merely detecting a flag in the same address, without using the steps of reading out the error memories byte by byte and judging whether or not there is an error bit.

In this embodiment, the number of bits of the error bit data (unit of the recording length for determining a position in which an error occurs) set to detecting the ASP error is 1 byte. However, this may be made, for example, 4 bits. Further, when a high preciseness is required in the error detection system, it is possible to reduce the number of bits to, for example, 2 or 3 bits. The number of bits of the error bit data is usually determined in relation to the test efficiency and preciseness of detection. In order to improve the test efficiency, the error bit data may be of 2 bits or more.

Further, in this embodiment, the ASP error is detected in cases where the SPK and MIS error occur, where the SPK and N-MOD errors occur, where the MIS and P-MOD errors occur and where the P-MOD and N-MOD error occur. However, only the ASP error can be detected in any of these cases.

Further, although, in this embodiment, the MIS error and the N-MOD and N-MOD errors are detected by the respective detection circuits simultaneously, it is, of course, possible to detect these errors separately.

Further, in this embodiment, the error bit data and the error position data are produced in the error detection unit. However, since it is enough that these data correspond to errors to be detected, respectively, the control unit can controls the system such that, in response to the reference signal and a signal indicative of the amount of rotation from the rotary encoder, the error data is produced by producing the error position data correspondingly to a test timing, reading the error bit data obtained from the error detection unit and making the error bit data correspondent to the error position data produced in the control unit.

What is claimed is:

1. In a magnetic disk certifier for detecting one of a spike error and a positive modulation error on the basis of a read signal obtained by reading out a test data written on a track of a magnetic disk by a MR head as a first error of said magnetic disk and detecting one of a missing error and a negative modulation error as a second error, a method of detecting a thermal asperity (ASP) error of said MR head comprising: the steps of detecting the first error and the second error in positions on said track, each of said positions having a recording length of a plurality of bits of the test data and judging a thermal asperity error when the first error and the second error are detected in one and the same position of said track.

2. A method as claimed in claim 1, further comprising the step of replacing said MR head when the thermal asperity error is judged.

3. A method as claimed in claim 2, further comprising the step of abandoning said magnetic disk when a thermal asperity error is judged when the first error and the second error are detected in one and the same position of a track by said replaced MR head.

4. A method as claimed in claim 1, wherein the recording length is 1 byte and wherein the ASP error large enough to replace said MR head is judged when the number of ASP errors each detected when the first error and the second error are detected in one and the same position of said track exceeds a predetermined value.

5. A method as claimed in claim 4, wherein the first and second errors are detected by comparators having threshold values as reference values corresponding to the respective errors and the threshold values are determined mean voltage values of the read signals read out from said track.

6. A magnetic disk certifier for detecting one of a spike error and a positive modulation error on the basis of a read signal obtained by reading out a test data written on a track of a magnetic disk by a MR head as a first error of said magnetic disk and detecting one of a missing error and a negative modulation error as a second error, said magnetic disk certifier comprising:

a detector for producing a rotation reference signal indicative of a rotational reference of said magnetic disk;

a write circuit for writing the test data;

a read circuit for outputting the read signal as an analog signal;

memories;

an error detection unit for producing bits indicative of presence or absence of errors corresponding to respective bits of the test data by comparing the analog signal with predetermined threshold values, and storing the bits in said memories as error data; and a control circuit for detecting a thermal asperity (ASP) error when the first and second errors exist on one and the same position on the track, said position determined by a recording length of the test data corresponding to a plurality of bits and the rotational reference signal, on the basis of a first error data obtained from said memories by setting a first one of the predetermined threshold values in said error detection unit, the first threshold value being used to detect one of the first error and the second error, and a second error data obtained from said memories by setting a second one of the predetermined threshold values in said error detection unit, the second threshold value being used to detect the other of the first error and the second error.

7. A magnetic disk certifier as claimed in claim 6, wherein said error detection unit includes comparators for comparing the analog signals with the predetermined threshold values and outputting bits indicative of presence or absence of the error and said control circuit includes a processor for performing the judgement of whether or not the first and second errors exist on said one and the same position on the track on the basis of the first and second error data.

8. A magnetic disk certifier as claimed in claim 7, wherein said detector further produces a signal indicative of an amount of rotation of said disk and said error detection unit produces a position data indicative of said position on the track, said position being determined correspondingly to the rotational reference signal and the signal indicative of the amount of rotation, and is adapted to store the position data and the error bit data composed of bits indicative of the presence and absence of the errors in said memories as error data.

9. A magnetic disk certifier as claimed in claim 8, wherein the recording length is 1 byte and wherein said control circuit judges the ASP error as being large enough to replace said MR head when the number of ASP errors each detected when the first error and the second error are detected in one and the same position on said track exceeds a predetermined value.

10. A magnetic disk certifier as claimed in claim 9, wherein the threshold values for detecting the first and second errors are determined mean voltage values of the read signal over said track.

11. A magnetic disk certifier as claimed in claim 10, wherein said error detection unit further produces a first code corresponding to the first error, produces a second code corresponding to the second error, attaches the first code to the first error data and attaches the second code to the second error and wherein said control circuit has a first and second memory regions corresponding to the first and second errors, respectively, and said control circuit reads the first and second error data from said memories and stores the first error data without the first code in said first memory region in sequence of the positions of the position data when there is the first code in the first and second error data read out and the second error data without the second code in said second memory region in sequence of the positions of the position data when there is the second code in the first and second error data read out.

12. A magnetic disk certifier as claimed in claim 11, further comprising a write circuit and a coil type magnetic head and wherein the test data is composed of a plurality of "1" bits and said processor controls a write operation for writing the test data in said track through said write circuit and said coil type magnetic head and controls a detection of the spike error, the missing error, the negative modulation error and the positive modulation error.

* * * * *